Fig. 5.

J. R. MOFFITT, DEC'D.
E. A. MOFFITT, ADMINISTRATRIX.
PULVERIZING MILL.
APPLICATION FILED NOV. 15, 1905.

988,293.

Patented Mar. 28, 1911
6 SHEETS—SHEET 6.

Witnesses
Otto E. Hoddick
Dena Nelson

J. R. Moffitt
Inventor

By
Attorney

UNITED STATES PATENT OFFICE.

JOHN R. MOFFITT, OF DENVER, COLORADO; EUGENIA A. MOFFITT ADMINISTRATRIX OF SAID JOHN R. MOFFITT, DECEASED.

PULVERIZING-MILL.

988,293.  Specification of Letters Patent.  Patented Mar. 28, 1911.

Application filed November 15, 1905. Serial No. 287,495.

*To all whom it may concern:*

Be it known that I, JOHN R. MOFFITT, a citizen of the United States, residing in the city and county of Denver and State of Colorado, have invented certain new and useful Improvements in Pulverizing-Mills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in pulverizing mills.

My improved construction, is adapted to take large pieces of rock and reduce it to any desired degree of fineness or pulverization. It is therefore not only a pulverizer in the ordinary sense of the term, but also performs the rock breaking and rock crushing function whereby the material is properly prepared for pulverization.

Having briefly outlined my improved construction as well as the function to be performed thereby, I will proceed to describe the same in detail reference being made to the accompanying drawing in which is illustrated an embodiment thereof.

In this drawing.

The same reference characters indicate the same parts in all the views.

Figure 1:
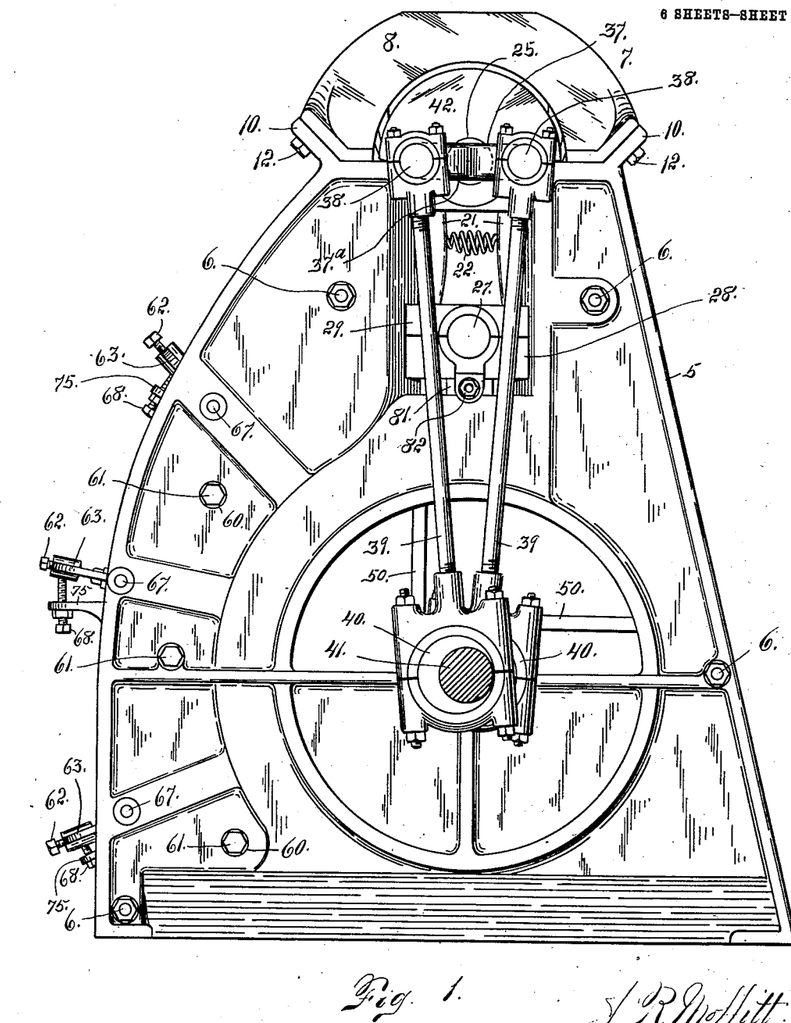
Figure 1 is a side elevation of my improved machine, the power shaft being shown in cross section.
Figure 2:
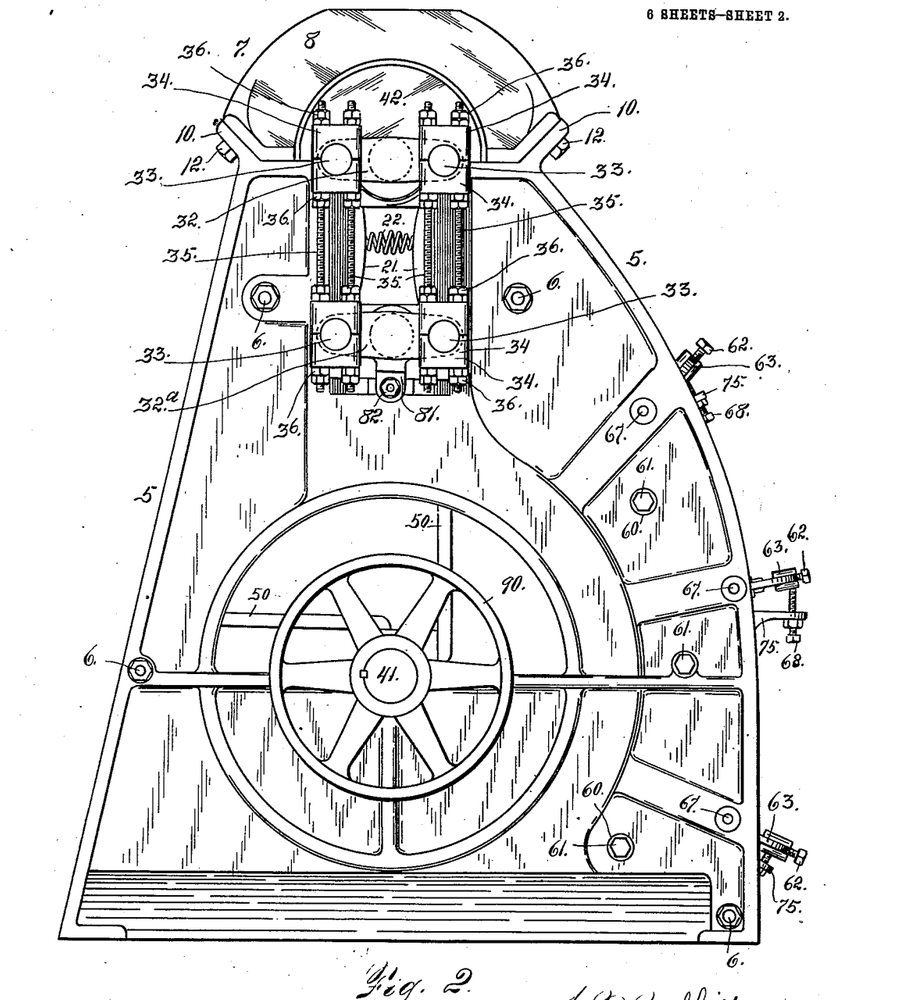
Fig. 2 is an elevation of the machine viewed from the opposite side or looking in the opposite direction from Fig. 1.
Figure 3:
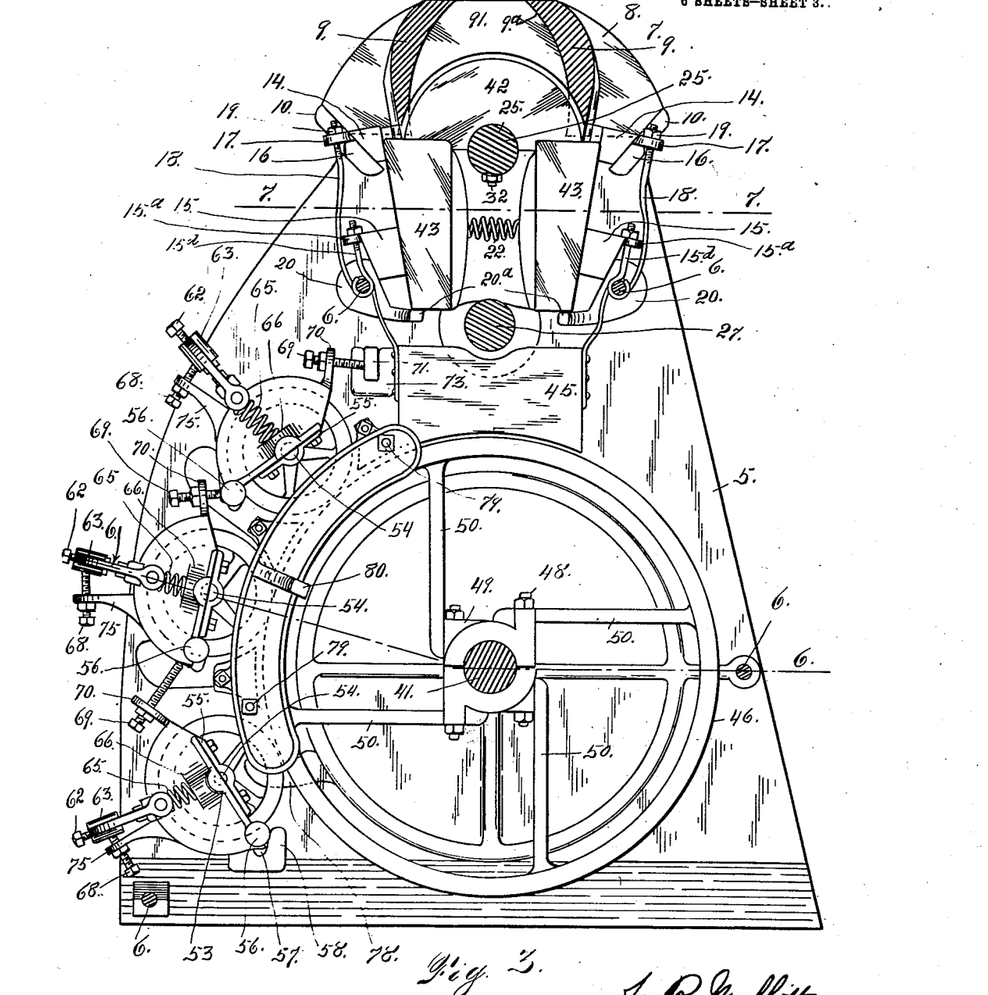
Fig. 3 is a view partly in section. In this view one of the upright frame members is removed while the rock shafts and the operating shaft are shown in section together with the bolts or tie rods which connect the main plates of the frame.
Figure 4:
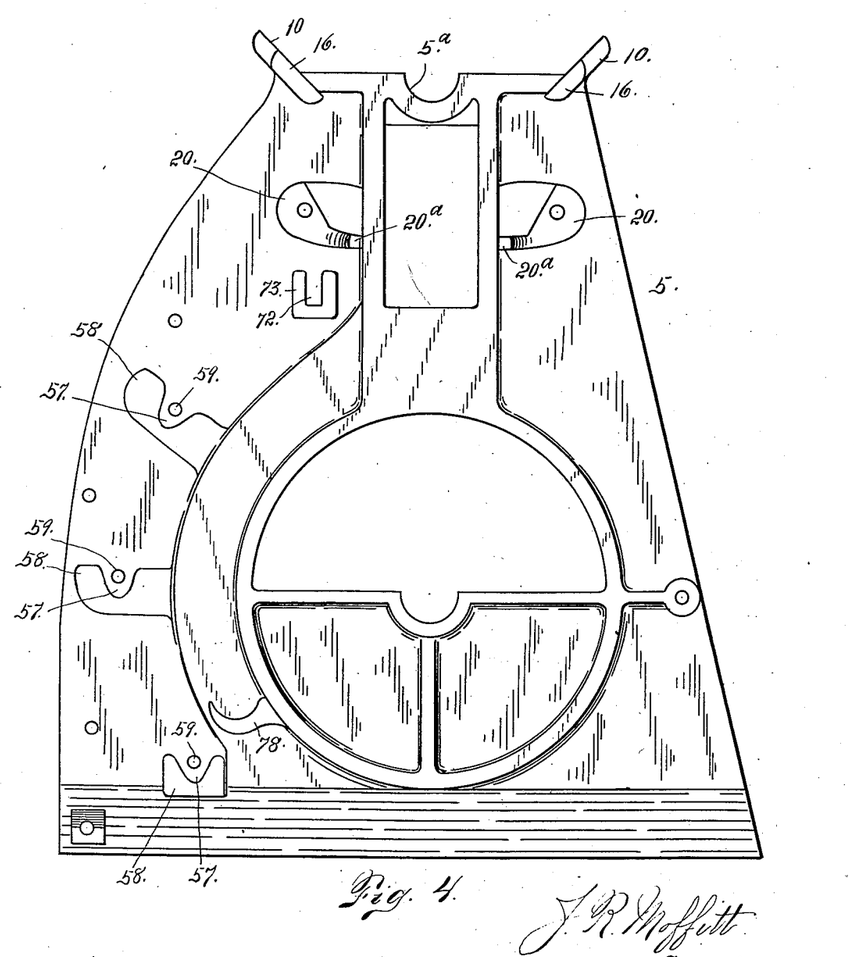
Fig. 4 is a detail view of one of the frame members.
Figure 5:
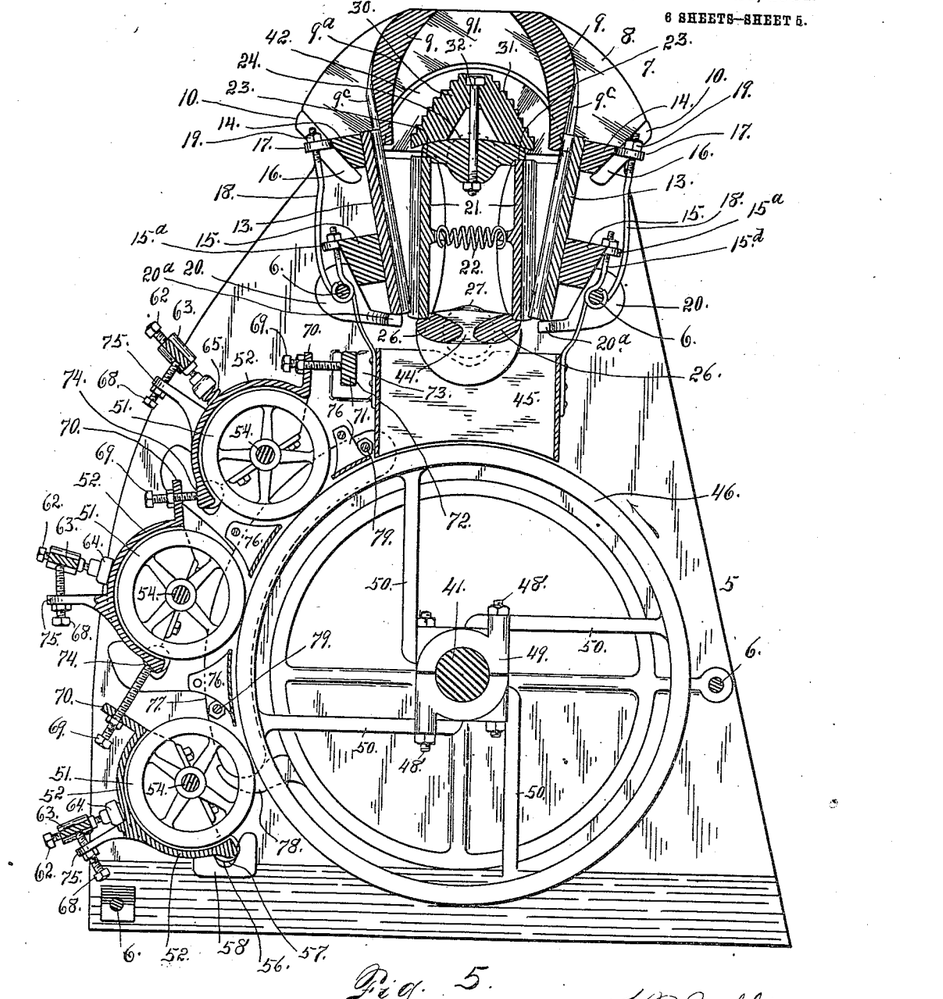
Fig. 5 is a vertical section taken through the upper part of the machine and also cutting the housing of the small pulverizing rolls. These rolls, however, as well as the large roll are shown in elevation.

Let the reference character 5 designate each of two substantially similar upright plates constituting the main frame work of the apparatus and between which the operating parts are located. These plates are connected together by bolts 6. Fig. 4 is an inside view of one of these frame plates or members. To the upper part of the frame is applied a cap 7 having side flanges 8 and intermediate members 9 coöperating with the movable rock breaking device as hereinafter explained. The cap 7 rests upon seats 10 formed at the top of the frame members, the cap being secured to the frame by means of bolts 12, thus making the cap stationary with the frame. The inner walls of the cap are curved as shown at $9^a$. The outer surface of the flanges 9 are corrugated as shown at $9^c$ to fit into or interlock with the inner corrugated surface of the stationary crushing jaws 13 which are held in place by wedge blocks 14 and 15 located on opposite sides of the machine. The upper wedge blocks 14 engage seats 16 located at the top of the frame members on opposite sides and located between the parts 8 of the cap, while the seats 10 of the frame are located outside of the parts 8. These seats 16 are inclined and the wedge blocks 14 have inclined faces engaging the corresponding faces of the said seats. Each wedge block has an apertured lug 17 through which passes the threaded extremity of a rod 18, a nut 19 being applied to the rod and screwed down against the lug. The lower extremity of each rod 18 is connected with one of the bolts 6. Each wedge block 15 engages a seat 20 formed on the inner surface of each frame member 5 and having an inclined face to engage the correspondingly shaped face of the wedge block. Each wedge block 15 is connected with the rod 6 by means of a rod or bolt $15^d$ which is hooked around the rod 6 while its threaded extremity is passed through a lug $15^a$ of the wedge block, the rod being secured in place by a nut applied thereto above the lug and screwed down thereon. These wedge blocks 14 and 15 located on opposite sides of the machine as aforesaid, hold the stationary crushing jaws 13 securely in place between the side frame members. The lower extremities of the jaws 13 rest upon supports $20^a$ which are continuous with the seats 20 of the frame; while the upper extremities of these jaws engage the housing members 9 exteriorly. The jaws 13 are inclined, their upper extremities extending farther outwardly than their lower extremities forming V-shaped spaces between the jaws 13 and the movable jaws 21. These movable jaws are connected by a coil spring 22 and their upper extremities engage seats formed in lateral projections 23 extending from opposite sides of a central web 24 connecting the end members of the rock shaft 25 which end members engage seats 5ª formed in the central part of the upper extremities of the frame members 5. The lower extremities of the movable crushing jaws 21 engage the opposite sides of a hopper-shaped web 26 which connects the end members of a shaft 27 whose extremities engage vertically movable bearing boxes 28 mounted in the frame members on opposite sides and coöperating with upper box members 29 to form the complete bearing for the journals.

Secured to the web 24 of the upper rock shaft, is an inverted V-shaped rock breaking jaw 30. This jaw has its opposite inclined surfaces 31 corrugated, toothed or roughened. It is secured to the web of the rock shaft by a bolt 32 centrally located and having a countersunk head at the top of the jaw, a nut being applied to its lower extremity. By virtue of this construction the jaw 30 coöperates with the adjacent sides of the members 9 of the housing, there being sufficient space between the jaw 30 and these housing walls to permit the insertion of pieces of rock of considerable size. This jaw 30 is so connected with the vertically disposed plates 21, that the three members when coöperating with the stationary members 9 and 13, form a complete rock breaking and crushing device, whereby large pieces of rock originally introduced are first broken and then crushed sufficiently fine to make it practicable to deliver them to the pulverizing roll mechanism as hereinafter explained.

The two shafts 25 and 27 are provided on one side of the machine with cross arms 32 and 32ª provided with wrist pins 33. The wrist pins of each cross arm are located on opposite sides of the shaft extremity and to them are applied suitable box members 34. Each wrist pin is engaged by two box members and these boxes of the two wrist pins on each side of the shafts are connected by threaded rods 35 to which are applied nuts 36 located both above and below the boxes. In this way the two shafts are connected to rock in unison, as hereinafter explained. On the opposite side of the machine from the cross arms 32, an additional cross arm 37 is applied to the shaft 25. This cross arm is provided with wrist pins 38 located on opposite sides of the shaft. To these wrist pins are connected the upper extremities of rods 39 whose lower extremities are connected with oppositely disposed eccentrics 40 with which the operating shaft 41 is provided. As these eccentrics occupy different planes, the upper extremities of the rods must also occupy different planes assuming that the rods are straight as shown in the drawing. For this reason the cross arm 37 is provided with a bend 37ª. From this explanation it will be understood that as the power shaft 41 is rotated, the two rods 39 are moved simultaneously in opposite directions. That is to say while one rod is moving upwardly the other rod is moving downwardly, thus imparting a rocking movement to the shaft 25 and also to the shaft 27 by virtue of the connection heretofore explained.

By using two eccentrics and two connecting rods in the relation just explained I have provided a well balanced construction whereby the required function is more efficiently performed than where only a single rod and eccentric are employed.

It may be stated that the rock breaking jaw 30 is provided at its opposite extremities with plates 42 between which the rock to be crushed passes. These plates 42 move with the rock shafts and the other movable members of the rock breaking and crushing mechanism.

Attention is called to the fact that when the rocking movement is applied to the rock shafts and the operating parts mounted thereon, there is practically no rubbing friction between the jaw 30 and the adjacent walls of the housing. In other words the movement of the jaw 30 is such that the rock is broken by a pressing or crushing action as distinguished from a grinding or sliding movement. This greatly relieves the wear of the parts. Attention is further called to the fact that by virtue of my improved construction it becomes practicable to impart a comparatively rapid movement to the movable rock breaking and crushing parts say four hundred revolutions to the minute referring to the operating shaft 41. This rapid movement makes the rock breaking and crushing action much more effective since the V-shaped rock breaking jaw is caused to strike the pieces of rock to be broken whereby its action is much more effective than would be the case with the movement slower as in the case of ordinary rock breaking constructions.

Figures 7, 8:
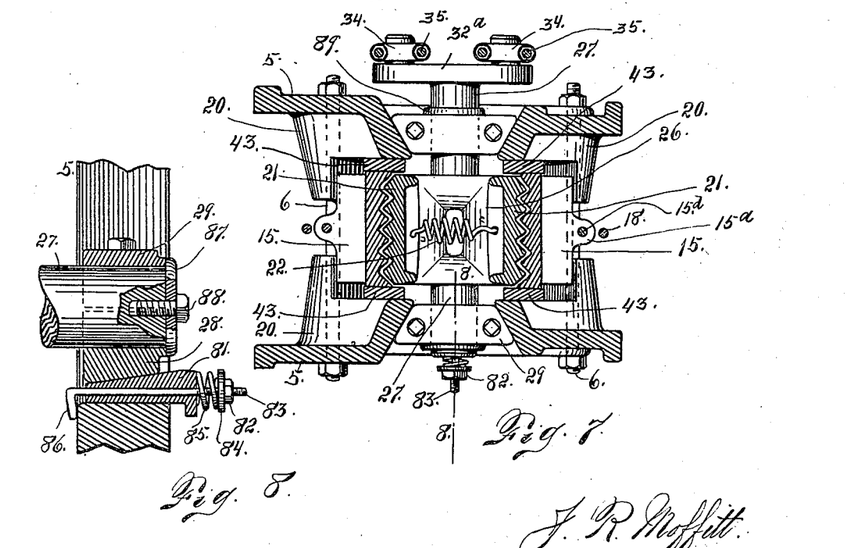
Fig. 8 is an enlarged section taken on the line 8—8 Fig. 7.

In assembling the parts heretofore described, cheek plates 43 are interposed between the frame members 5 and the coöperating jaws 21 and 13. There are four cheek plates (see Fig. 7) one being on each side of each pair of these jaws whereby the material acted on by the jaws is directed downwardly and prevented from escaping between the jaws and the frame members. Any material that may work inwardly between the jaw plates 21, passes downwardly through an opening 44 formed at the bottom of the hopper-shaped web 26. The material passing through this opening 44 as well as the crushed material which leaves the lower extremities of the jaws 21 and 13, passes downwardly through an open-ended casing 45, and comes in contact with the periphery of a large pulverizing roll 46 which is clamped to the operating shaft 41 by means of bolts 48 passing through a divided hub 49 which embraces the shaft. These hub members are connected with the rim by spokes 50. The divided construction of hub gives an opportunity for clamping the wheel tightly to the shaft and also affords means for readily attaching and detaching the same.

Mounted between the frame members and arranged adjacent the periphery of the large pulverizing roll, is a number of smaller pulverizing rolls 51, three being shown in the drawing. It must be understood that any desired number of these small rolls which may be deemed necessary, may be employed. These smaller rolls coöperate with the large roll in the performance of the pulverizing function. The uppermost roll takes the crushed material and reduces it to a predetermined size. The next roll coöperating with the larger roll and being under greater tension, still further reduces the material; while the lowermost roll completes the pulverizing act being forced against the material under still greater tension. Each small roll 51 is inclosed exteriorly by means of a housing 52 having partial bearings 53 adapted to receive the roll axle 54. Half bearings 55 are applied to the bearing parts 53 whereby the extremities of the axle journals are completely inclosed. The bearing parts 53 of the housing partially close the axle bearings at the ends as shown at 55 whereby the roll axle is locked against endwise movement.

Each housing 52 is provided at its lower extremity with cylindrical projections 56 which engage recesses 57 formed in interiorly projecting lugs 58 with which the frame members 5 are provided. Threaded openings 59 are formed in the frame members, communicating with the recesses 57. The casing is reinforced exteriorly as shown at 60 where these openings 59 are formed. In these openings are threaded centering bolts 61 which engage the lugs 56 on opposite sides of the housing. By means of these bolts the rolls 51 and their housings are properly centered to cause the said rolls to coincide as to position with the periphery of the large roll 46, with which the smaller rolls coöperate.

The rolls 51 and their housings are adapted to swing on an axle passing through the centers of the adjusting screws 61 and the cylindrical projections 56 of the housing members. These rolls and their housings are held in suitable proximity to the large roll 56 by means of tension bolts 62 threaded in yokes 63 and engaging recessed blocks which act on coil springs 65 whose inner extremities bear against lugs 66 formed on the housing members considerably above the axis upon which the housings and their rolls are adapted to swing. As shown in the drawing there are two tension bolts 62 for each housing. Each yoke 63 is mounted to swing on pins 67 mounted in the frame members 5 on opposite sides. These yokes are so adjusted that the action or force exerted by the tension bolt 62 is directly in line with the axis of the rolls. In other words this pressure is applied to each roll in the line of a radius of the small roll which also coincides with the produced radius of the large coöperating roll. By virtue of this arrangement the small rolls are maintained in proper operative relation with the large roll as will be readily understood.

Before adjusting the tension bolts 62 in the yoke 63, the latter are properly adjusted by the use of bolts 68 whereby the inwardly extending arms of the yokes are radially disposed with reference to the large and small rolls. The tension bolts 62 are then screwed inwardly whereby the desired tension or yielding force is exerted on the small rolls. The rolls and their housings are prevented from moving too close to the large roll, through the instrumentality of adjusting bolts 69 which are threaded in lugs 70 formed on the upper part of each housing. The inner extremities of the uppermost bolts 69 engage a transverse bar 71 whose extremities engage sockets 72 formed in lugs 73 with which the inner surfaces of the frame members 5 are provided. The inner extremities of the bolts 69 of each lower housing member, bear against the lower part of the housing member next above as shown at 74. It is evident that by virtue of these bolts 69 arranged as aforesaid, the movement of the smaller rolls in the direction of the periphery of the large roll may be limited at will. It may be stated that the bolts 68 for adjusting the position of the yoke 63 are threaded in projections 75 formed on the respective housing members.

Adjacent the periphery of the larger roll and between the casing 45 and the uppermost smaller roll, is located a baffle plate 76 which prevents the material from being thrown outwardly from the larger roll by centrifugal force, above the smaller roll. This plate confines the material and gives the coöperating rolls a better chance to act directly thereon. There is a similar baffle plate 76 located between the smaller rolls and adjacent the periphery of the larger roll for the same purpose.

Figure 6:
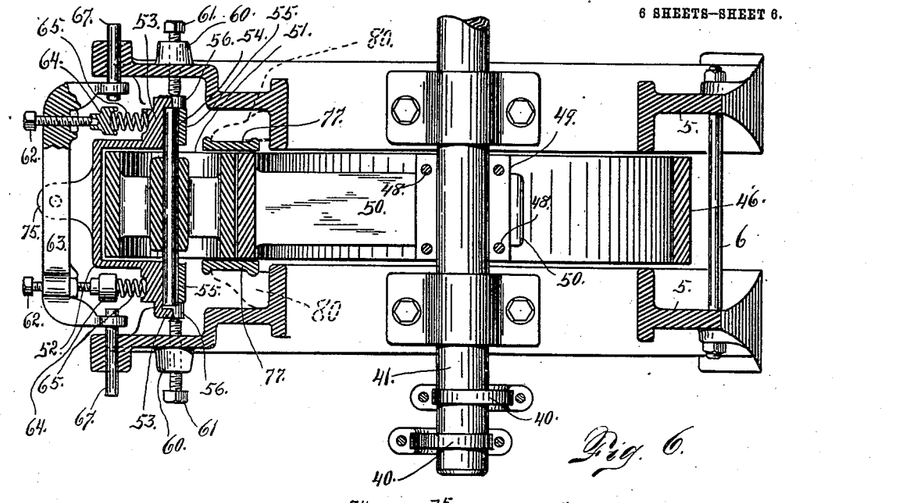
Figs. 6 and 7 are sections taken on the lines 6—6 and 7—7 of Fig. 3 respectively looking downwardly.

Between the side members of the frame and the active portions of the peripheries of the coöperating rolls, are located cheek plates 77, which confine the material to be acted on by the rolls within their zone of activity. The lower extremities of these cheek plates rest on lugs 78 with which the inner surfaces of the frame plates are provided. These cheek plates are connected by bolts 79. Each cheek plate is provided with an outwardly projecting lug 80 which engages the inner surface of the adjacent frame plate 5. The position of these lugs 80 is shown by dotted lines in Fig. 6, the section having been so taken in this view that these lugs cannot be shown in full lines.

The vertical position of the rock shaft is regulated by an adjustable wedge block 81 located below each bearing block 28. Each wedge block is forced inwardly by a nut 82 threaded on the outer extremity of a rod 83 and bearing against a washer 84 which engages a coil spring 85 surrounding the rod 83 and interposed between the wedge block and the washer. This rod passes through the wedge block and is provided with a hook-shaped extremity 86 which engages the frame plate 5 on the inside.

The bearing members 28 and 29 at one extremity of the shaft 27, are prevented from moving outwardly by a disk 87 applied to the shaft extremity by a stud bolt 88 and of sufficient size to engage the said bearing members on the outside. A collar 89 performs the same function for the corresponding members on the opposite side of the machine.

From the foregoing description the use and operation of my improved mill will be readily understood. Power is applied to the operating shaft 41 by a pulley 90 connected with any suitable power. As this shaft is rotated its eccentrics 40 move the rod 39 which being journaled in wrist pins 33 of the cross arm 32, oscillate the shaft 25 which is fast at one extremity to the center of the lever arm 32. The movable crushing jaws 30 and 31 being located between and carried by the webs 24 and 26 of the rock shafts 25 and 27, the said jaws are actuated to perform the rock breaking and crushing functions as the aforesaid movement is imparted to the rock shaft 25, the material to be treated being fed into a central opening 91 at the top of the mill whereby the said material occupies a position between the breaking surfaces of the V-shaped jaw 30 in the adjacent walls of the housing. The shaft 41 is given a comparatively rapid movement whereby the jaw 30 performs the rock breaking function by a series of blows delivered upon the rock as it is fed into the housing at the top of the machine. By reason of this rapidity of movement the rock breaking and rock crushing function is performed more rapidly as hereinbefore explained. The crushed rock finally escapes at the lower extremities of the jaws 13 and 21, passing through the casing 45 to the periphery of the large roll 46 by which it is carried to the rolls 51 successively. The only movement the rolls 51 have, is that imparted by the material interposed between the large roll and the smaller rolls and acting on the latter by friction to produce the necessary rotation. The tension of these smaller rolls is such that by the time the material has been acted on by the said rolls from the uppermost to the lowermost, it is reduced to the predetermined or necessary fineness.

Having thus described my invention, what I claim is:—

1. The combination with a suitable frame work, of two rock shafts journaled therein and connected to operate in unison, one being located directly above the other, parallel rock crushing plates mounted on the rock shafts and yieldingly connected, a rock breaking jaw mounted above the rock crushing plates, suitable jaws coöperating with the rock breaking and rock crushing jaws, and suitable means connected with one of the rock shafts and actuating the latter by an upward movement on one side and a simultaneous downward movement on the other side, comprising a coöperating shaft, connecting rods, and a pulverizing roller fast on the operating shaft and whose axis is in the same vertical plane with the axis of the rock shaft.

2. The combination with a suitable frame work, of two rock shafts journaled therein and connected to operate in unison, one being located directly above the other, parallel rock crushing plates mounted on the rock shafts and yieldingly connected, a rock breaking jaw mounted above the rock crushing plates, suitable jaws coöperating with the rock breaking and rock crushing jaws, and suitable means connected with one of the rock shafts and actuating the latter by an upward movement on one side and a simultaneous downward movement on the other side.

3. In apparatus of the class described the combination with a suitable frame work of two rock shafts journaled therein and connected to operate in unison, one being located directly above the other, rock crushing plates mounted on the rock shafts and yieldingly connected, a breaking jaw mounted above the crushing plates and connected with one of the rock shafts, stationary jaws coöperating with the rock breaking and rock crushing means, an operating shaft provided with oppositely disposed eccentrics, a suitable connection between the two eccentrics and one of the rock shafts whereby one eccentric acts to impart an upward movement on one side of the shaft, while the other eccentric operates to impart a downward movement on the other side of the shaft, and pulverizing means actuated by the operating shaft and coöperating with the rock breaking and rock crushing jaws, substantially as described.

4. The combination with a suitable frame work, of two rock shafts journaled therein and connected to operate in unison, one being located directly above the other, parallel rock-crushing plates mounted on the rock shafts and yieldingly connected, an inverted V-shaped rock breaking jaw mounted above the rock crushing plates and connected with one of the rock shafts to rock therewith, suitable jaws coöperating with the rock breaking and rock crushing jaws, and suitable means connected with one of the rock shafts and actuating the latter by an upward movement on one side and a simultaneous downward movement on the other side comprising a coöperating shaft, connecting rods and a pulverizing roll fast on the operating shaft and whose axis is in the same vertical plane with the axes of the rock shafts, substantially as described.

5. The combination with a suitable frame work, of two rock shafts journaled therein one directly above the other, rock breaking and rock crushing jaws mounted on the rock shafts to move therewith, the two shafts being connected to operate in unison, an operating shaft, a suitable connection between the operating shafts and one of the rock shafts to impart a suitable movement thereto, a pulverizing roll made fast to and operated by the operating shaft, the axis of the operating shaft being in the same vertical plane with the axes of the rock shafts, a housing mounted upon the frame work and inclosing the rock breaking jaw, the said housing having walls performing the function of stationary jaws coöperating with the rock breaking jaw, relatively stationary jaws mounted on the frame work and coöperating with the crushing jaws, and suitable means for regulating the position of the stationary jaws, substantially as described.

6. The combination with a suitable frame work, two rock shafts journaled therein and connected to move in unison one being located above the other, crushing jaws mounted on the rock shafts, a rock breaking jaw connected with one of the rock shafts above the crushing jaws, a cap mounted on the upper extremity of the frame and inclosing the rock breaking jaw, relatively stationary jaws inclined outwardly from the crushing jaws to form V-shaped spaces between them, and wedge blocks engaging the relatively stationary jaws on one side, the frame work being provided with seats for the wedge blocks on the opposite side, adjustable means connected with the wedge blocks for locking the same in place, an operating shaft connected with one of the rock shafts and a pulverizing roll mounted on the operating shaft and having its axis in the same plane with the axis of the rock shafts.

7. The combination with a suitable frame work, of rock shafts journaled therein, rock crushing plates mounted on the rock shafts, a rock breaking jaw mounted above the said plates, suitable jaws coöperating with the rock breaking and crushing jaws, means for actuating the rock shafts, and pulverizing means coöperating with the rock breaking and rock crushing jaws, the said pulverizing means having its axis in the same plane with the axis of the rock shafts, substantially as described.

8. The combination of rock breaking and rock crushing mechanism, a large pulverizing roll located below the said mechanism, a number of smaller coöperating rolls, housings adjustably mounted on the frame work in suitable proximity to the large pulverizing roll, the smaller pulverizing rolls coöperating with the larger roll and journaled in the respective housings, each housing and the roll carried thereby being independently adjustable, and tension means acting on the housings, to cause the smaller rolls to coöperate with the large roll to perform the pulverizing function.

9. In means of the class described, the combination of rock breaking and rock crushing mechanism, a large pulverizing roll located below said mechanism, housings journaled to swing toward and away from the large pulverizing roll, independently of each other, distinct tension means connected with each housing, and pulverizing rolls journaled in the respective housings, movable therewith for purposes of adjustment and coöperating with the large roll for the purpose set forth.

10. In mechanism of the class described, the combination with means for performing the rock crushing function, of a large pulverizing roll mounted to receive the crushed rock, and a number of housings mounted to swing toward and away from the large pulverizing roll, the movement of each housing being independent of the movement of the other housings, adjustable tension means acting on said housings, the tension of each housing being distinct and separate from that of the other housings, and smaller pulverizing rolls journaled in the housings and coöperating with the large pulverizing roll, substantially as described.

11. The combination with a suitable supporting frame, of two rock shafts journaled therein and provided with integral webs, intermediate their extremities, parallel plates whose extremities engage the webs of the two shafts, a yielding connection between the said plates whereby they are held in operative engagement with the webs, a coöperating stationary jaw located on opposite sides of the said plates, a rock breaking jaw mounted on the uppermost web, stationary jaws located on opposite sides of the rock breaking jaw, a suitable connection between the rock shafts, to cause them to rock in unison, and an operating shaft for actuating the said rock shafts, substantially as described.

12. The combination with a pulverizing roll, of other coöperating rolls, housings in which the other rolls are journaled, the housings being mounted to swing independently of each other to and from the first named roll, a yoke mounted on each housing, a tension screw threaded in each yoke, a spring engaging each housing at one extremity and a block interposed between each tension screw and the opposite extremity of the spring, the tension means of each housing being distinct and separate from that of the other housings, substantially as described.

13. In apparatus of the class described, the combination of a pulverizing roll, a second coöperating roll, a housing in which the second roll is journaled, the said housing being pivotally mounted at one extremity whereby it is adapted to swing to and from the first named roll, a screw threaded in a part of the housing, a stop which the screw engages for limiting the travel of the housing toward the first named roll, a yoke pivotally mounted on the housing, means for adjusting the yoke to cause it to assume a position in the radius of both rolls, and tension means acting on the housing in the plane of said radius, and including a screw threaded in the yoke.

14. In mechanism of the class described, the combination with a large pulverizing roll, means for imparting a rotary movement to said roll, and a number of small coöperating pulverizing rolls, arranged in suitable proximity to the periphery of the main roll, housings partially inclosing said small rolls, adjustable tension means acting on said housings, the tension of each housing being distinct and separate from that of the other housings, and suitable means for limiting the movement of each of the small rolls separately toward the large roll for the purpose set forth.

15. In an ore crusher, the combination of the frame, a hopper, a crusher in said hopper, comprising a movable crushing member and a fixed crushing member, a pulverizer beneath said crusher comprising a roller mounted upon a driving shaft, rollers mounted in adjustable bearings and adapted to co-act with said roller, means for driving said shaft, a cam on said shaft and a connection between said cam and the movable crusher member substantially as set forth.

In testimony whereof I affix my signature in presence of two witnesses.

JOHN R. MOFFITT.

Witnesses:
 DENA NELSON,
 A. J. O'BRIEN.